United States Patent [19]

Morikawa et al.

[11] Patent Number: 5,289,764
[45] Date of Patent: Mar. 1, 1994

[54] APPARATUS FOR DIVIDING BREAD DOUGH OR THE LIKE

[75] Inventors: Michio Morikawa; Koichi Hirabayashi; Susumu Kominato, all of Utsunomiya, Japan

[73] Assignee: Rheon Automatic Machinery Co., Ltd., Tochigi, Japan

[21] Appl. No.: 64,543

[22] Filed: May 19, 1993

[30] Foreign Application Priority Data

| May 25, 1992 | [JP] | Japan | 4-157538 |
| Nov. 17, 1992 | [JP] | Japan | 4-330955 |
| Nov. 17, 1992 | [JP] | Japan | 4-330956 |

[51] Int. Cl.$^5$ .................. A21C 5/00; A21C 7/01; A21C 15/04
[52] U.S. Cl. .................. 99/537; 99/450.1; 99/485; 425/311; 425/297; 425/142
[58] Field of Search .............. 99/352, 353, 355, 356, 99/426, 450.1, 450.2, 450.7, 483, 485, 537, 538; 426/272, 503, 512, 513; 425/142, 145, 164, 238, 305.1, 311, 315, 204, 296, 297, 307, 308, 324.1, 403.1; 83/359, 365

[56] References Cited

U.S. PATENT DOCUMENTS

| 1,932,345 | 10/1933 | Kremmling | 425/311 |
| 2,488,046 | 11/1949 | Werner et al. | 425/311 |
| 2,890,662 | 6/1959 | Baiocchi | 425/311 |
| 3,415,206 | 12/1968 | Reisman | 425/311 |
| 3,568,251 | 3/1971 | Walker | 425/311 |
| 3,737,269 | 6/1973 | Grady | 425/311 |
| 4,552,523 | 11/1985 | Suzuki | 99/450.1 |
| 4,556,379 | 12/1985 | Ikishima | 425/297 |
| 4,597,731 | 7/1986 | Suzuki | 426/272 |
| 4,676,727 | 6/1987 | Atwood | 99/537 |
| 5,200,203 | 4/1993 | Hayashi | 425/142 |

Primary Examiner—Timothy F. Simone
Attorney, Agent, or Firm—Limbach & Limbach

[57] ABSTRACT

An apparatus for dividing bread dough or the like is provided, which comprises a dough-cutting member (38) comprising a saw blade means, two dough-supporting members (30, 56), a drive means for reciprocating the saw blade means, and a discharge means (57) for regulating the pieces of bread dough cut to have a thickness corresponding to a preset distance from the dough outlet (35) of the apparatus, thereby producing pieces of bread dough having a uniform thickness. A similar apparatus is modified, which has an adjusting means for moving a second dough-supporting member (112) parallel to its stationary position, thereby changing the size of the dough outlet (35) of the apparatus to meet a required thickness of the bread dough to be cut. Also, a similar apparatus is provided, which has a pressing means (160) for pressing the bread dough in a hopper for dough to maintain the pressure in the bread dough at a uniform value, whereby almost all the bread dough in the hopper (15) can be cut.

9 Claims, 11 Drawing Sheets

APPARATUS FOR DIVIDING BREAD DOUGH OR THE LIKE

BACKGROUND OF THE INVENTION

1. Field of the Invention

This invention relates to an apparatus for dividing bread dough. In particular, the invention relates to an apparatus for dividing bread dough in which the pieces of cut bread dough are regulated to have a thickness corresponding to a preset distance from the dough outlet of the apparatus. Thereby pieces of bread dough that each have a plate-like form of a uniform thickness are obtained. It relates more particularly to an apparatus in which by a simple operation the thickness of bread dough to be cut can be adjusted. Further, it particularly relates to an apparatus for dividing bread dough into pieces of bread dough having a plate-like form, without regard to the remaining amount of dough in a dough hopper when the amount of the dough mass is decreasing. This results in an efficient dough production, which leads to a greatly standardized bread-dough product. Thus, the automated production of bread dough and the like having a high quality can be promoted.

2. Prior Art

U.S. Patent application Ser. No. 08/045,963 discloses an apparatus for dividing bread dough or the like. It comprises a dough-cutting member comprising a saw blade means, two dough-supporting members, and a drive means for reciprocating the saw blade means. By this prior-art apparatus, a plastic material such as bread dough or confectionery dough is smoothly severed, whereby pieces of divided bread dough, each having a plate-like form in which no stress has occurred, are obtained. However, because, at the initial stage of the cutting of bread dough, due to its static friction resistance to an outer force, the dough-cutting member advancing into the bread dough causes the stress in the bread dough to be increased. Therefore, after a piece of bread dough has been discharged from the dough outlet, the leading end of the piece of bread dough is deformed to somewhat expand, by the reaction of the stress occurring in the hopper, against the outer force. Accordingly, these pieces of divided bread dough did not necessarily have an exactly uniform thickness.

Further, in the prior-art apparatus, the positional relationship between the first and second dough-supporting members is stationary, namely, they are in a fixed relationship. Therefore, to adjust or change a thickness of the bread dough to be cut, the mounting position of the second dough-supporting member to the frame had to be changed. This leads to complications and inefficiency.

Moreover, the decrease in the amount of the bread dough in the hopper causes the weight of the dough mass in the hopper to be decreased, so that the pressure in the dough decreases. Therefore, the bottom of the bread dough mass against which the dough-cutting member advances cannot be held down by the weight of the bread dough against the dough-supporting member. Thus, the bread dough mass cannot resist the advancing cutting member, so that the dough-cutting member merely pushes a part of the dough mass in any direction with the bread dough mass not being cut. Therefore, not all of the bread dough charged in the hopper would be available to be cut. This leads to an uneconomical use of the bread dough.

SUMMARY OF THE INVENTION

This invention aims to combine the prior-art apparatus with a discharge means for regulating the thicknesses of pieces of cut bread dough so as to have a uniform thickness, thereby providing an apparatus for dividing a bread dough mass by which it can be smoothly sliced into pieces of bread dough having a uniform thickness.

This invention further aims to combine the prior-art apparatus with an adjusting means for adjusting the size of the dough outlet, thereby providing an apparatus for dividing a bread dough mass by which the positional relationship of the first and second dough-supporting members can be easily adjusted, so that the thickness of the bread dough to be cut is easily changed.

This invention still further aims to combine the prior-art apparatus with a pressing means for pressing the bread dough in the hopper, so that the pressure in the bread dough in the hopper is maintained at a uniform value. Therefore, almost all of a dough mass in the hopper can be cut and divided into pieces having a uniform shape and quantity.

By one aspect of this invention, an apparatus for dividing bread dough is provided, which comprises a hopper for dough, the bottom of which is constituted by a first dough-supporting member, a second dough-supporting member, a dough-cutting member, and a dough outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and positioned at said forward edge of said first dough-supporting member, a drive means for reciprocating said saw blade means in its longitudinal direction while said first dough-supporting member is moved in its advancing direction, said second dough-supporting member being movable in the same direction and in synchronization with said first dough-supporting member, being provided with a flat upper surface positioned at a level below the upper surface of said first dough-supporting member, thereby forming said dough outlet, having a preset distance, between said second dough-supporting member and said cutting member, and a drive means for moving said first and second dough-supporting members back and forth, characterized by a discharge means, arranged adjacent and below said dough-cutting member, for regulating the thickness of a piece of dough cut so as to have a thickness corresponding to said preset distance.

By another aspect of this invention an apparatus for dividing bread dough is provided, which comprises a hopper for dough, the bottom of which is constituted by a first dough-supporting member, a second dough-supporting member, a dough-cutting member, and a dough outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and positioned at said forward edge of said first dough-supporting member, a drive means for reciprocating said saw blade means in its longitudinal direction while said first dough-supporting member is moved in its advancing direction, said second dough-supporting member being movable in the same direction and in synchronization with said first dough-supporting member, being provided with a flat upper surface positioned at a level below the upper surface of said first dough-supporting member, thereby forming said dough outlet between said second dough-supporting member and said cutting member, and a drive means for moving said first and second dough-supporting members back and forth, characterized by an adjusting means for moving said second dough-supporting member parallel with and relative to said first dough-supporting member, thereby to adjust the size of said dough outlet.

By still another aspect of this invention, an apparatus for dividing bread dough or the like is provided, which comprises a hopper for dough, the bottom of which is constituted by a first dough-supporting member, a second dough-supporting member, a dough-cutting member, and a dough outlet, said first dough-supporting member being movable back and forth, and comprising a flat upper surface, a bottom surface, a horizontal forward edge, and a rearward edge, said forward edge extending perpendicularly to the direction of movement of said member, said dough-cutting member comprising a saw blade means, and positioned at said forward edge of said first dough-supporting member, a drive means for reciprocating said saw blade means in its longitudinal direction while said first dough-supporting member is moved in its advancing direction, said second dough-supporting member being movable in the same direction and in synchronization with said first dough-supporting member, being provided with a flat upper surface positioned at a level below the upper surface of said first dough-supporting member, thereby forming said dough outlet between said second dough-supporting member and said cutting member, and a drive means for moving said first and second dough-supporting members back and forth, characterized by a pressing means, provided in said hopper for dough, for pressing dough in said hopper for dough, said pressing means having a pressing board.

The discharging means of this invention is provided below and adjacent the dough outlet of the apparatus. Therefore, before a piece of cut bread dough is placed on a supply conveyor that receives the piece of bread dough, the discharge means regulates the thickness of the piece of cut bread dough so that the piece has a thickness that exactly corresponds to the gap of a preset distance from the dough outlet. This leads to pieces of cut bread dough having a uniform thickness. Also, this results in the effective joining of pieces of dough to make a uniform strip of bread dough.

The adjusting means for adjusting the size of the dough outlet of this invention is adapted to move the second dough-supporting member parallel with and relative to its base position, independent of the first dough-supporting member. Therefore, in response to the desired thickness values of the bread dough to be cut, the operator can easily adjust the size of the dough outlet. Thereby the bread dough can be cut into pieces having a desired thickness.

The pressing means of this invention is provided in the hopper of the dividing apparatus. Therefore, the pressing means can press the bread dough in the hopper. Thus, during the cutting operation of the bread dough, the pressure in the bread dough can be maintained at a uniform value to resist the cutting member advancing into the bread dough, and to hold the bread dough so as not to be pulled by the cutting member, while being effectively cut. Therefore, even when the bread dough in the hopper is decreased due to the progress of the cutting operation, the cutting member can cut the bread dough while it is held by the pressure from the pressing means. This enables almost all the bread dough charged in the hopper to be economically cut into divided bread dough pieces.

PREFERRED EMBODIMENTS OF THE INVENTION

The first embodiment of this invention will now be explained by reference to the attached drawings.

Figure 1:
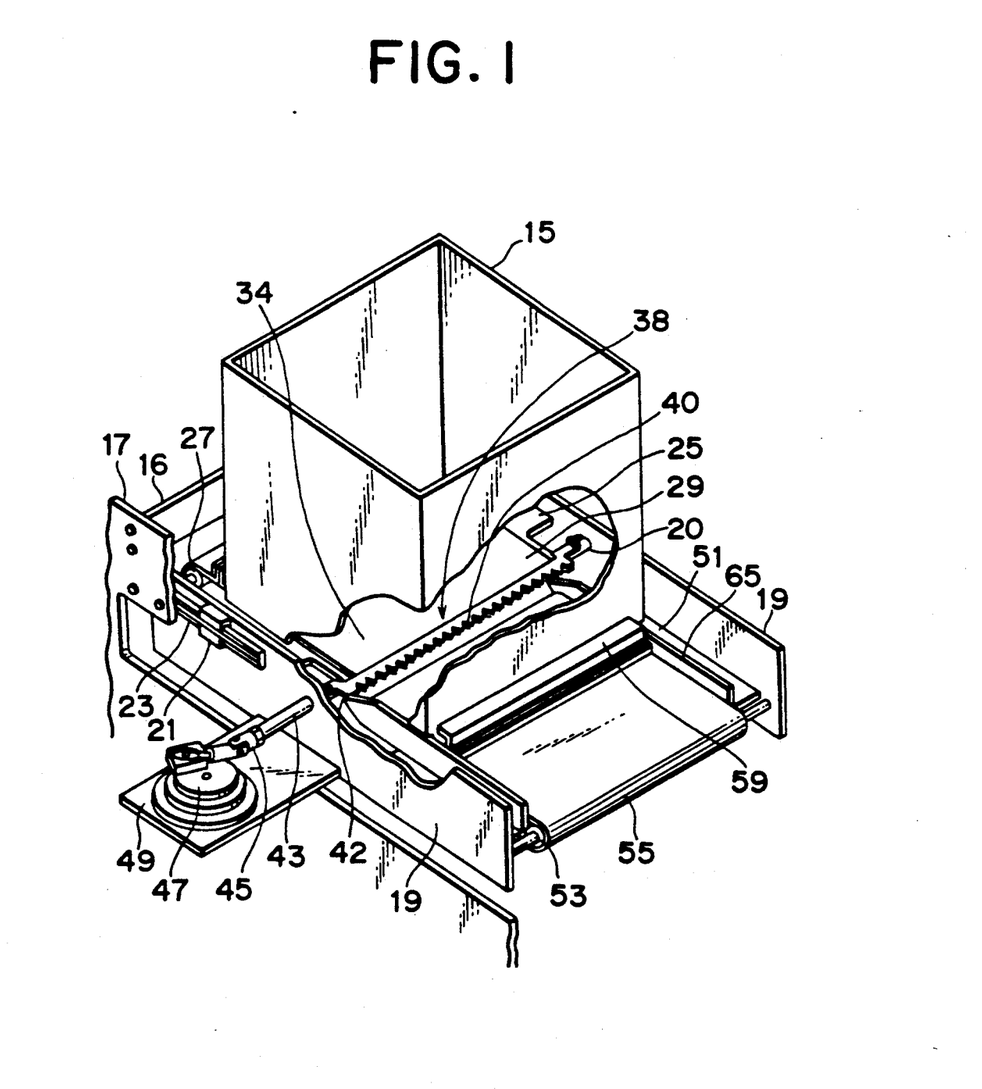
FIG. 1 is a perspective view illustrating a first embodiment of this invention, partially broken away.

In FIG. 1, a hopper (15) for accomodating a bread dough mass (14)(see FIG. 2) is mounted on a beam (16), which is fixed on a base (17). Slide rails (23) are mounted on the base (17), and slide bearings (21) are mounted on a frame (19). The slide rails (23) and the slide bearings (21) are slidably combined. The frame (19) is adapted to be moved horizontally, and to move backward and forward relative to the base (17), by any conventional drive means.

A first plate (25), which is flat and square, is mounted horizontally on the frame (19). Adjacent the rear edge of the first plate (25), a first roller (27) is rotatably mounted on the frame (19). A first belt (29) is entrained on the first plate (25) and first roller (27). The first plate (25), first roller (27), and first belt (29), constitute the main elements of a first dough-supporting member (30)(see FIGS. 2 and 3). The first dough-supporting member (30) has a flat upper surface (34)(see FIG. 3), a horizontal forward edge, a lower surface, and a rearward edge. The horizontal forward edge extends perpendicularly to the direction of movement of the first dough-supporting member (30). The two ends of the first belt (29) are securely mounted on a first bracket (33) extending from one of the sides of the hopper (15)(see FIG. 2). Therefore, the horizontal movement of the frame (19) causes the first plate (25) and the first roller (27) to be moved horizontally. Although the frame (19) is moved horizontally so as to change its position relative to the hopper (15), the positional relationship of the part of the first belt (29) to the bottom (36)(see FIG. 2) of the bread dough mass (14) in the hopper (15) is not changed. Namely, upon the horizontal movement of the frame (19), the first plate (25) and the first roller (27) are moved horizontally in the same direction as the frame (19). However, since the first belt (29) is fixed at the first bracket (33), it does not rotate around the first plate (25), but instead, the area of the belt (29) is changed due to the movement of the first dough-supporting member (30).

The first belt (29) may be endless, or it may be removed. In such a case the advantage of the above-mentioned embodiment of the belt will not be obtained, but in such a case the embodiment may still be workable depending on various parameters and by adding other means to loosen the friction between it and the dough above it.

A dough-cutting member (38), namely, a saw blade means, comprising upper and lower saw blades (40 and 42), is positioned in front of the forward edge of the first belt (29), and installed on the frame (19). The edges of each of the blades are aligned with each other. The distance between the adjacent tips of the blades (40 and 42) is 5 mm, and the depth of the trough of each of the blades (40 and 42) is 4.3 mm. The edge of the upper saw blade (40) is flush with the flat upper surface (34)(see FIG. 3) of the first dough-supporting member (30). The two ends of the upper saw blade (40) are securely mounted on the frame (19), and one of the two ends of the lower saw blade (42) is connected to a slide rod (43). The other end of the lower saw blade (42) is adapted to be slidably received in a hole (20) formed on the frame (19). The upper saw blade (40) and lower saw blade (42) are in a positional relationship wherein the edges of these blades are aligned with each other. The slide rod (43) extends through the frame (19), and is connected by means of a universal joint (45) to a crank device (47). The crank device (47) is installed on a small plate (49) fixed to the frame (19). Therefore, when the crank device (47) is rotated by a motor (not shown), the lower saw blade (42) is reciprocated at a stroke of 20 mm in the longitudinal direction, while the blades (40,42) are advanced, at a speed of 4 mm/min, together with the first dough-supporting member (30). This lower saw blade (42) may be mounted on the frame (19), and the upper saw blade (40) may be mounted on the slide rod (43). In this case, the upper saw blade (40) is reciprocated. Also, the lower and upper saw blades (40,42) may be arranged so that both saw blades are reciprocated in the direction perpendicular to the movement of the first dough-supporting member (30), while they slide in relation to each other.

Figure 2:
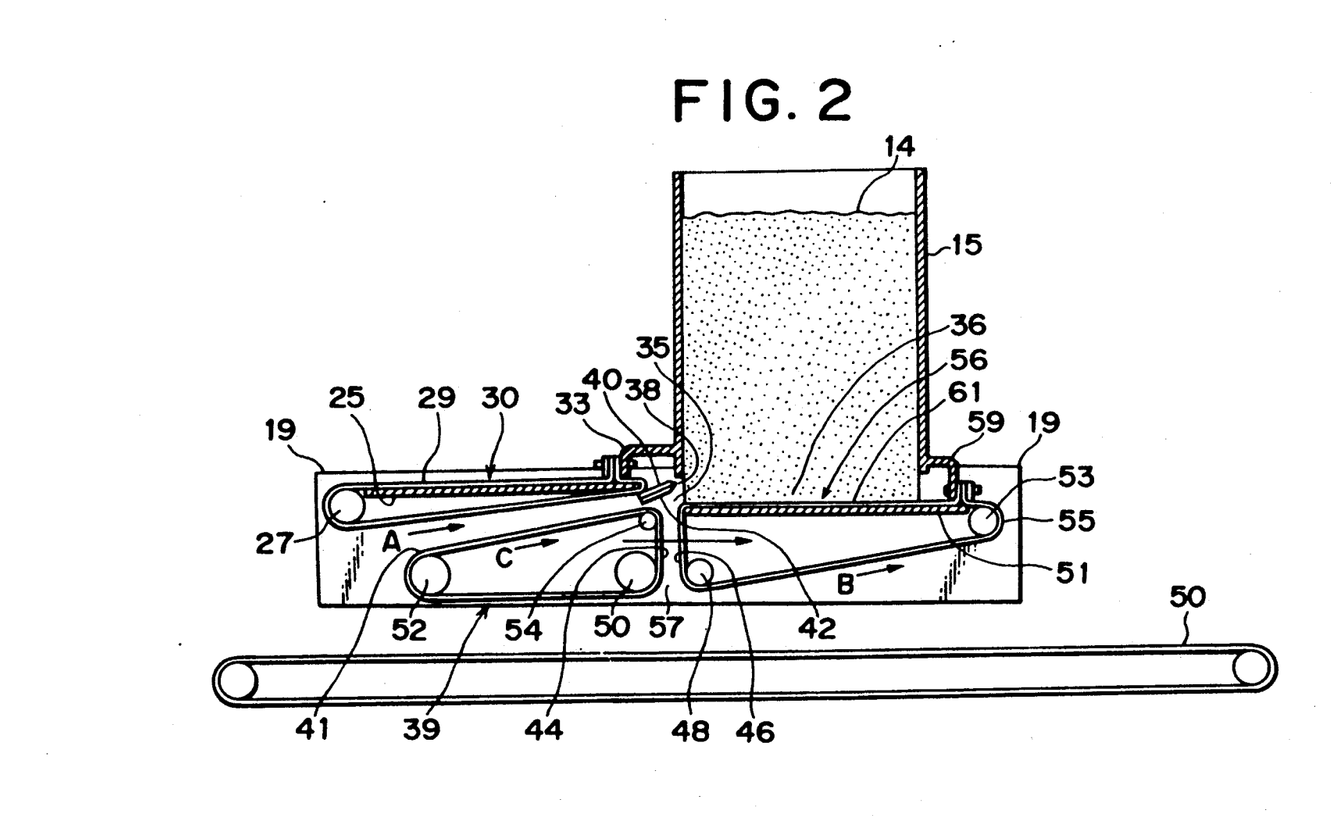
FIGS. 2 and 3 are sectional and side elevational views of the first embodiment illustrating this invention.

In FIG. 2, a second plate (51) is mounted on the frame (19) in a position below the dough-cutting member (38). A second roller (53) and a guide roller (48) are rotatably mounted on the frame (19). A second belt (55) is entrained on the second plate (51), the second roller (53), and the guide roller (48). The second plate (51), rollers (48 and 53), and the second belt (55), constitute the main elements of a second dough-supporting member (56). It has a flat upper surface (61), a forward edge, a lower surface, and a side (46), namely, a vertical surface provided by a part of the second belt (55), tensioned between the rear edge of the second plate (51) and the guide roller (48). The second dough-supporting member (56) is adapted to be moved horizontally back and forth since it is mounted on the frame (19). The flat upper surface (61) is positioned below the flat upper surface (34) of the first dough-supporting member (30). The two ends of the second belt (55) are securely mounted on a second bracket (59) extending from the side of the hopper (15) opposite from the side from which the first bracket (33) extends.

Since the second dough-supporting member (56) is mounted on the frame (19) like the first dough-supporting member (30), it is evident that the second dough-supporting member (56) is adapted to be moved in the same direction as, and in synchronization with, the first dough-supporting member (30). Since the rear edge of the second dough-supporting member (56) is positioned to be lower than and spaced apart from the saw blades (40 and 42), a dough outlet (35) is provided between the second dough-supporting member (56) and the dough-cutting member (38). The gap of the dough outlet (35) is set to have a preset distance, in response to a desired thickness of bread dough to be cut. This presetting procedure is attained by changing the position where the second dough-supporting member (56) is mounted on the frame (19). The first and/or second dough-supporting members, the dough-cutting member (38), and the dough outlet (35), constitute the bottom of the hopper (15).

A driven roller (52) adapted to be rotated by a drive means (not shown), and guide rollers (50 and 54), are rotatably mounted on the frame (19). A belt (41) is entrained on the rollers (50, 52, and 54). The belt (41) and the rollers (50, 52, and 54) constitute a discharge conveyor (39). A part of the belt (41) tensioned between the rollers (50 and 54) provides a vertical surface, namely, a side (44). It faces the side (46) of the belt (55) of the second dough-supporting member (56). Thus, adjacent and below the dough-cutting member (38), a discharge means, namely, a discharge path (57), is provided. The belt (41) is adapted to be moved in a direction indicated by an arrow (C) in FIG. 2 at the same speed as that of the belt (55) of the second dough-supporting member (56). Therefore, the discharge path (57) can convey a piece of bread dough cut downward while compressing it, thereby regulating the thickness of the dough piece to a preset thickness.

The gap of the discharge path (57) is designed to equal the preset gap of the dough outlet (35). Simultaneously with the advancing of the frame (19), the side (44) of the belt (41) and the side (46) of the belt (55) are adapted to cooperatively compress a piece of divided bread dough and convey it downward, thereby discharging it to a supply conveyor (50). In this embodiment, a part of the second belt (55) of the second dough-supporting member (56) and a part of the belt (41) of the discharge conveyor (39) constitute the discharge means, namely, the discharge path (57). However, it may be constituted by a part of the belt (41) and a part of the belt of another belt conveyor arranged separately from the second dough-supporting member (56). In this case, a part of the belt (41) faces a part of another belt conveyor to provide the discharge path (57).

The increase and decrease of the area of the part of the flat upper surface (61) of the second dough-supporting member (56) positioned in the hopper (15) are in an inverse relationship to the increase and decrease of the area of the part of the flat upper surface (34) of the first dough-supporting member (30) in the hopper (15). Two guards (65)(see FIG. 1), to prevent the dough from overflowing from the flat upper surface (61), are mounted on the second plate (51), adjacent both sides of the second belt (55).

The operation of the first embodiment of the apparatus for dividing the bread dough will be explained below.

At the beginning of the cutting operation, the bottom (36) of the dough mass (14), kneaded by a conventional technique and supplied to the hopper (15), is supported only by the flat upper surface (61) of the second dough-supporting member (56), as shown in FIG. 2. The dough-cutting member (38), positioned at the forward end of the first dough-supporting member (30), is outside of the hopper (15). A drive gear (not shown) causes the frame (19) to move right as viewed in FIG. 3, whereby the cutting operation starts. The speed that the frame (19) advances, namely, the speed that the dough-cutting member (38) advances, is 4.5 m/min. When the frame (19) begins to move, a motor (not shown) causes the crank device (47)(FIG. 1) to begin to rotate. This rotation causes, through the universal joint (45), the slide rod (43) to be reciprocated. Therefore, the saw blade (42) is reciprocated, so that the cutting movement begins. The stroke of the reciprocating movement of the saw blade (42) is 23 mm. Thus, the edges of the cutting member (38) advance into the dough mass (14), and smoothly sever it.

The reciprocating movements of the saw blade (42) are effective in cutting bread dough that has a strong elasticity and a high cutting resistance. When the saw blades (40 and 42) enter the dough mass (14), they do not impart any forcible or pulling action to the dough mass (14). Therefore, no stress occurs in the dough. The dough mass (14) is severed and divided into dough pieces, while a finely cut surface is formed. The advance of the frame (19) causes the first plate (25) to be advanced together with the saw blades (40 and 42). Therefore, by the guiding of the forward end of the first plate (25), the part of the belt (29) positioned on the lower surface of the first dough-supporting member (30) is also advanced in a direction indicated by an arrow (A), and moves past the forward edge of the first plate (25) and becomes a part of the flat upper surface (34). By the rightward movement of the first dough-supporting member (30), the area of the flat upper surface (34) positioned in the hopper (15) increases.

Figure 3:
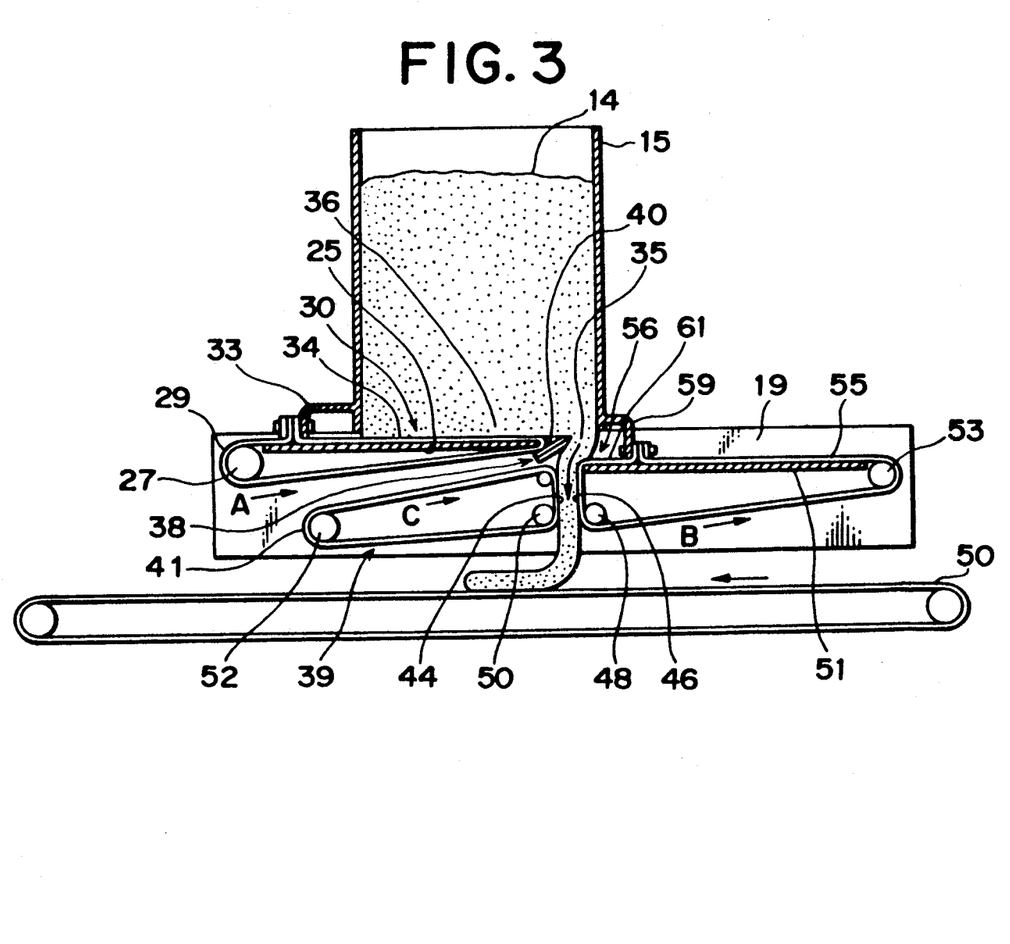

Simultaneously with the beginning of the cutting operation of the bread dough, the second belt (55) is retracted in a direction indicated by an arrow (B) shown in FIG. 3, so that the area of the flat upper surface (61) is decreased. Since the two ends of the second belt (55) are securely mounted on the second bracket (59), the flat upper surface (61) of the second belt (55) does not move relative to the lowest part (36) of the bread dough (14). Thus, no tensile force due to any possible friction between the flat upper surface (61) of the belt (55) and the dough is imparted to it. Accordingly, not only can the dough mass be smoothly cut by the saw blades (40 and 42), but also, no stress in the dough mass that remains in the hopper (15) occurs.

FIG. 3 shows that a part of the dough mass (14) has been nearly severed by the saw blades (40 and 42), that the leading end of a dough part that has almost become a separate piece of dough is located on a supply conveyor (50), and that a dough part to be the end of a piece of dough is still connected to the dough mass in the hopper (15), and that a part near it is held and compressed between the sides (44 and 46). During the cutting operation, since the two ends of the first belt (29) are securely mounted on the first bracket (33), the first belt (29) cannot be freely rotated, and it is maintained stationary relative to the dough mass (14) inside the hopper. Namely, the flat upper surface (34) can stably contact and support the bottom (36) of the dough mass (14).

The saw blades (40 and 42) are advanced until they cross the dough mass, and then a piece of dough is completely divided from the dough mass (14). When the saw blades (40 and 42) are advanced to their preset location, the belt (41) of the discharge conveyor (39) and the belt (55) of the second dough-supporting member (56) convey the end of a piece of divided dough between the sides (44 and 46) of the belts and discharge it to the supply conveyor (50). The thickness of the piece of divided bread dough is regulated between the side (44) of the belt (41) and the side (46) of the second dough-supporting member (56), so that the piece of divided bread dough has a thickness corresponding to a preset distance from the dough outlet (35). Thus, the pieces of the divided bread dough have a uniform thickness. During each of the cutting movements, the conveyor (50) may be arranged to be stationary, or to be actuated to convey a piece of divided bread dough left at a speed to avoid the bend in the piece of bread dough that would arise if the bread dough to be transferred to the supply conveyor (50) is thin.

When the cutting of the bread dough mass (14) by the saw blades (40 and 42) is finished, the reciprocating movements of the saw blade (40) are stopped. Simultaneously, the frame (19) begins to move in a direction opposite to that in the cutting operation, to return to the beginning position. At the same time, the area of the flat upper surface (34) begins to decrease. During the retraction of the first dough-supporting member (30) no pulling action is applied to the bread dough mass (14). Also, the area of the flat upper surface (61) is increased. In this case also, no pulling action is applied to the bread dough mass (14). Finally, the frame (19) returns to the beginning position, so that one cycle of the cutting operation is completed.

A second embodiment of this invention will now be explained by referring to the attached drawings.

Figure 4:
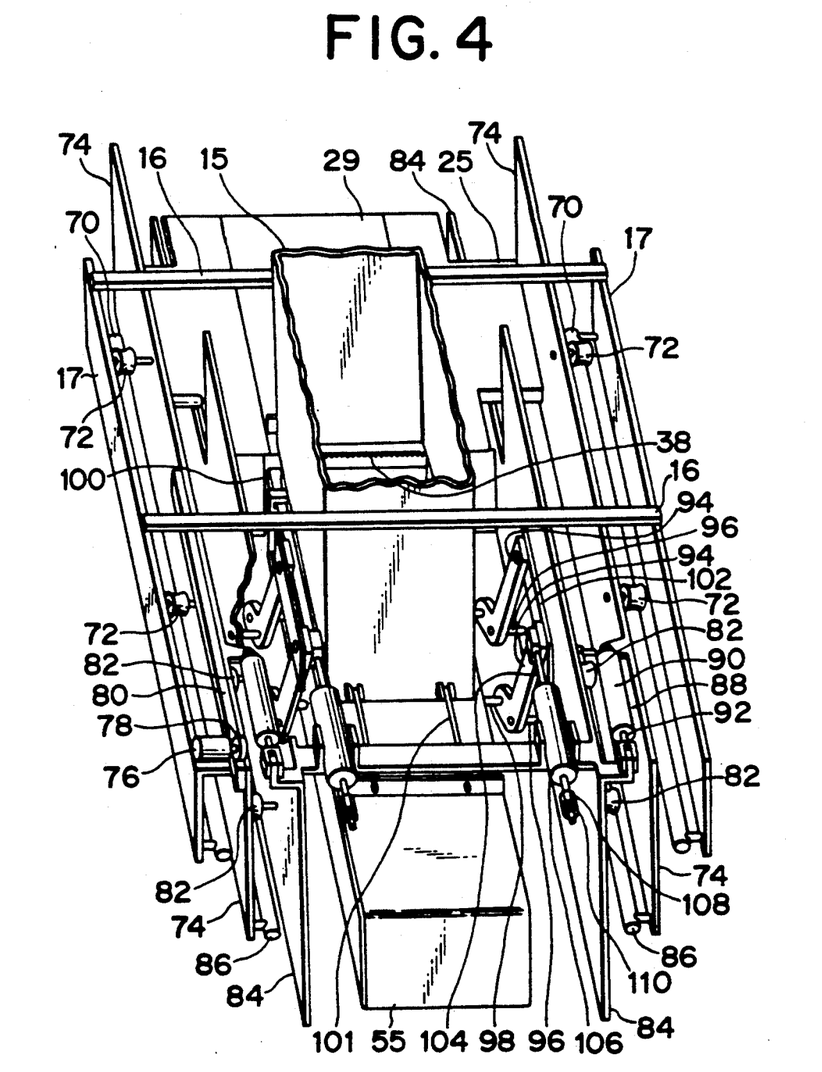
FIG. 4 is a perspective view illustrating a second embodiment of this invention, partially broken away.

In FIG. 4, a hopper (15) is mounted on beams (16) fixed to a base (17). A rail (70) is mounted on the base (17) at each side of the hopper (15). Two wheels (72) are mounted on an outer frame (74) at each side of the hopper (15). The wheels (72) can run on the rails (70). The outer frame (74) is adapted to be moved horizontally back and forth relative to the base (17). The horizontal backward and forward movement of the outer frame (74) is attained by a motor (76). A pinion (78) is connected to the motor (76), and is adapted to be rotated by the motor (76) to move a rack (80) back and forth.

A first plate (25) is mounted on the outer frame (74). A first belt (29), having two ends, is entrained on the first plate (25) to provide a flat upper surface (114)(see FIG. 5) for supporting the bread dough in the hopper (15). The first plate (25) and the first belt (29) constitute the main element of a first dough-supporting member (71)(see FIG. 5).

Figure 5:
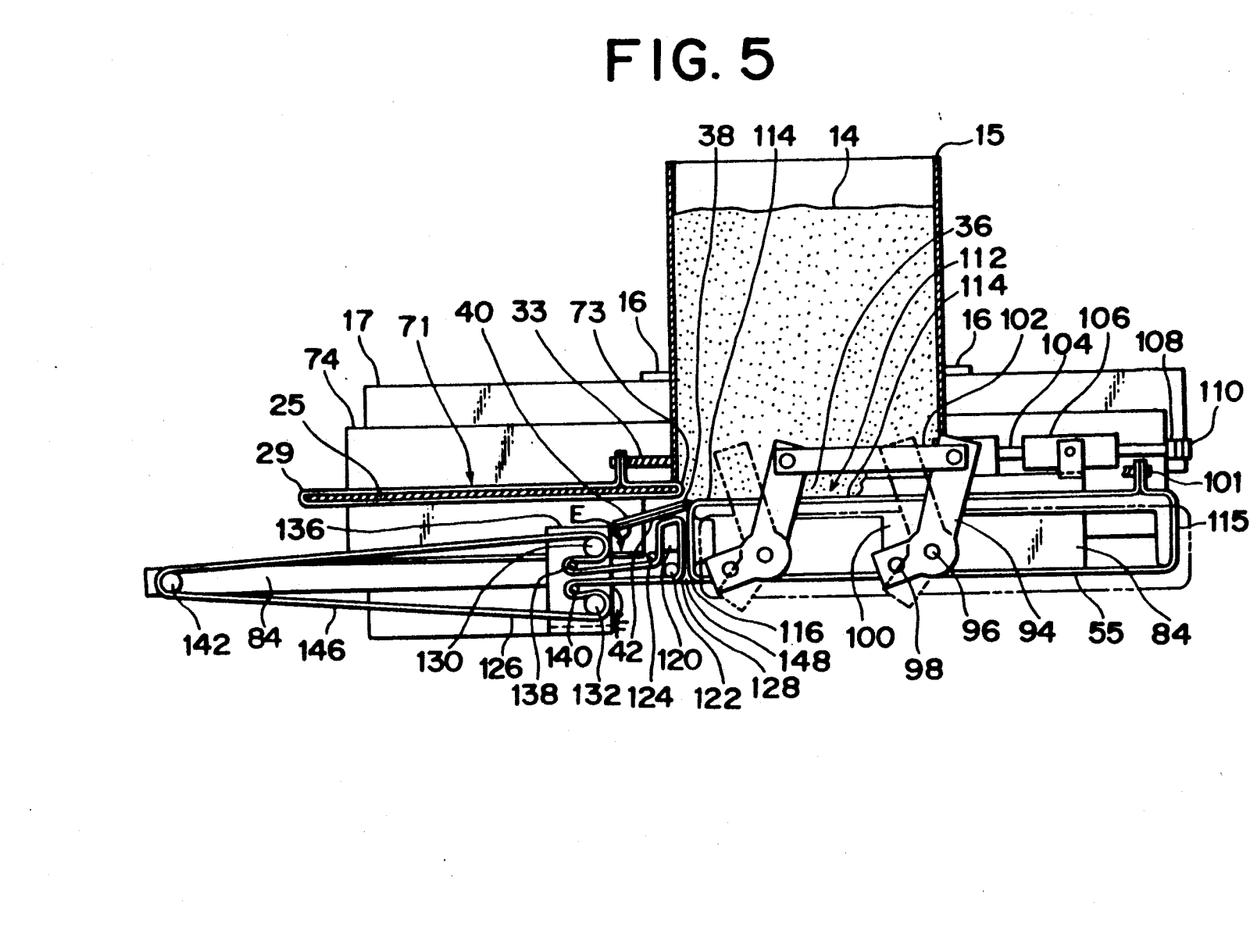
FIG. 5 is a sectional and side elevational view of the second embodiment illustrating this invention.

In FIG. 5, the first dough-supporting member (71) has a flat upper surface (73), a horizontal forward edge, a lower surface, and a rearward edge. The horizontal forward edge extends perpendicularly to the direction of movement of the first dough-supporting member (71). The two ends of the first belt (29) are securely mounted on a first bracket (33) extending from one of the sides of the hopper (15). Although the outer frame (74) is moved horizontally so as to change the position of the first plate (25) relative to the hopper (15), the positional relationship of the flat upper surface (73) to the bottom (36) of the bread dough mass (14) in the hopper (15) is not changed. Namely, only the area of the flat upper surface (73), which constitutes the bottom of the hopper (15), is changed.

Adjacent the hopper (15), the dough-cutting member (38) is arranged near and below the top of the first plate (25). The member (38) is mounted on the outer frame (74) such that only the edges of the dough-cutting member (38) protrude from the top of the first plate (25). The reason that the dough-cutting member (38) is arranged below the first plate (25) is to decrease its overhang beyond the forward end of the first plate (25). Thus, any distortion of the dough-cutting member (38) due to the weight of the dough mass (14) is decreased. This results in the edges of the dough-cutting member (38) not being damaged. The dough-cutting member (38) comprises a saw blade means, namely, upper and lower saw blades (40 and 42). The upper saw blade (40) is mounted on the outer frame (74), and the lower saw blade (42) is adapted to be reciprocated in its longitudinal direction. The upper saw blade (40) and lower saw blade (42) are in a positional relationship wherein the edges of these blades are aligned.

In FIG. 4 a rail (86) is mounted on the outer frame (74) at each side of the hopper (15), at a position nearer the hopper (15) than the position where the first plate (25) is mounted on the outer frame (74), and at the side of the outer frame (74) opposite the side at which the wheels (72) are rotatably mounted. Wheels (82) are rotatably mounted on an intermediate frame (84), and they can run on rails (86). The intermediate frame (84) is adapted to be moved horizontally back and forth relative to the outer frame (74). This horizontal backward and forward movement is attained by an air cylinder (88). The cylinder body (90) of the air cylinder (88) is mounted on the outer frame (74).

A pair of swing elements (94) is swingably mounted on the intermediate frame (84) on each side of the hopper (15). Each swing element (94) has a first shaft (96) swingably connected to it and extending from the inner side of an intermediate frame (84), opposite the side on which the wheels (82) are mounted. The swing element (94) consists of an arm extending, in two directions, from a point where the first shaft (96) is mounted, to form an obtuse angle. Near the lower end of the two arms of the swing element (94), a second shaft (98) is provided so as to swingably support an inner frame (100). The top part of the swing element (94) is swingably mounted on a connecting plate (102). The connecting plate (10) connects the two swing elements (94) on each side of the hopper (15). A set of two forward and rearward swing elements (94) constitute a link mechanism.

One of the two ends of the rod (104) of an air cylinder (106) is swingably mounted on one of the two swing elements (94) on each side of the hopper (15), thereby providing a drive source for the link mechanism. The air cylinder (106) is mounted on each of the intermediate frames (84). Therefore, the inner frame (100) is adapted to be moved parallel to the intermediate frame (84). An adjusting nut (108) and a lock nut (110) are mounted on the other end of the rod (104) opposite the end on which the link mechanism is mounted. Thereby the operator can adjust the distance the rod (104) protrudes or retracts. Thus, the link mechanism and the drive source are arranged at each side of the hopper (15), to support the inner frame (100) such that it can be moved parallel to its resting position.

In FIG. 5, a second belt (55), having two ends, is entrained on the inner frame (100). The second belt (55) and the inner frame (100) constitute the main elements of a second dough-supporting member (112). It has a flat upper surface (114), a forward vertical surface, a lower surface, and a rearward vertical surface (116) near the dough-cutting member (38). The two ends of the second belt (55) are securely mounted on a second bracket (101) extending from the side of the hopper (15).

The horizontal movements of the outer frame (74) and the intermediate frame (84) change the positional relationship of the inner frame (100) to the hopper (15). However, the positional relationship of the flat upper surface (114) to the bottom (36) of the dough mass (14) is not changed. The area of the flat upper surface (114), which constitutes the bottom of the hopper (15), is merely increased or decreased, without the second belt (55) being able to rotate around the inner frame (100).

The increase and decrease of the area of the flat upper surface (114) are in an inverse relationship to the increase and decrease of the area of the flat upper surface (73) in the hopper (15).

The intermediate frames (84) are connected by a small plate (120), on which small rollers (122 and 124) are rotatably mounted. Driven rollers (130 and 132) are mounted on a bracket (136) that extends from the base (17). The periphery of each of the driven rollers (130 and 132) is arranged so as to frictionally engage the inner surface of the endless belt (126). Assist rollers (138 and 140) are also mounted on the bracket (136). An endless belt (126) is entrained on the small plate (120), the rollers (122 and 124), the driven rollers (130 and 132), the assist rollers (138 and 140), and a takeup roller (142) mounted on the rear end of the intermediate frame (84), to form a conveyor (146). A part of the belt (126) stretched around and between the small plate (120) and the roller (122) provides a vertical surface (128) that faces the rearward vertical surface (116). The vertical surface (128) extends to a position adjacent the dough-cutting member (38). The assist rollers (138 and 140) help the endless belt (126) to be wound around the driven rollers (130 and 132). The rearward vertical surface (116) formed by the second belt (55) and the vertical surface (128) formed by the belt (126) of the conveyor (146) provide a discharge path (148).

The rollers (130 and 132) are adapted to be forcibly rotated, through the frictional engagement between them and the belt (126), by the movement of the belt (126) entrained on them. However, by using a one-way clutch (not shown), the rollers (130 and 132) can be rotated only in the directions indicated by respective arrows (E) and (F). In other words, if the belt (126) transmits a tangential force to the periphery of either roller (130 or 132), it cannot be rotated counterclockwise.

On the one hand, the intermediate frame (84), the small plate (120) connected thereto, and the takeup roller (142), can move in unison to the right. On the other hand, the bracket (136) on which the driven rollers (130 and 132) and the assist rollers (138 and 140) are mounted is stationary, because the bracket (136) is fixed to the base (17). Therefore, when the intermediate frame (84) begins to move right, the small plate (120) is caused to move away from the set of the four rollers (the driven rollers and assist rollers) mounted on the stationary bracket (136). Thus, tension is generated in the part of the belt (126) stretched between the set of the four rollers and the small plate (120). This tension causes the belt (126) to transmit a tangential force to the periphery of the driven roller (132) that would rotate it counterclockwise if unchecked. However, it cannot do so, because of the braking action of the one-way clutch. Also, the positional relationship between the belt (126) and the roller (132) remains stationary. In contrast, when that tension causes the belt (126) to transmit a tangential force to the periphery of the driven roller (130) so as to rotate it clockwise, it can be rotated in a direction indicated by an arrow (E), or clockwise, because its rotatable direction is the same as the moving direction of the belt (126). Therefore, while the intermediate frame (84) advances, the part of the belt (126) positioned at the left side of the driven roller (130) is advanced in a direction indicated by an arrow (G) shown in FIGS. 7 and 8. That part of the belt (126) passes the rollers (130, 138, and 124).

After the cutting operation is finished and the intermediate frame (84) returns to its starting position, tension is generated in the part of the belt (126) stretched between the set of the four rollers and the takeup roller (142). This tension causes the belt (126) to transmit a tangential force to the periphery of the driven roller (132) so as to rotate it clockwise, namely, in a direction indicated by an arrow (F) in FIG. 10. Since the driven roller (132) is adapted to be rotated in the direction (F), it can do so. In contrast, the belt (126) transmits a tangential force to the periphery of the driven roller (130) in a counterclockwise direction, but it cannot be rotated in such a direction, because the driven roller (130) can rotate only clockwise. Therefore, the positional relationship between the belt (126) and the roller (130) remains the same.

The operation of the second embodiment of the apparatus for dividing bread dough will be explained below.

Figure 6:
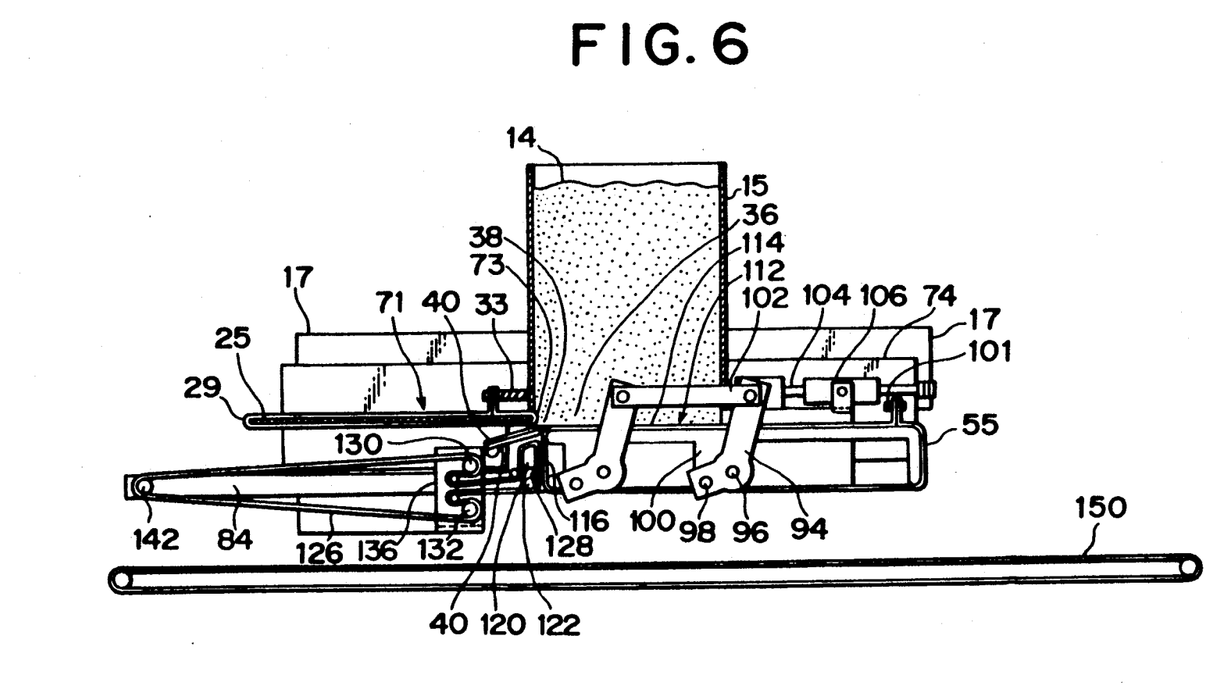
FIGS. 6 to 10 are sectional and side elevational views showing the movements of the second dough-supporting member of the second embodiment of this invention.

As shown in FIG. 6, at the beginning of the cutting operation the bottom (36) of the dough mass (14), kneaded by a conventional technique and supplied to the hopper (15), is supported only by the flat upper surface (114) of the second dough-supporting member (112). The dough-cutting member (38) and the flat upper surface (73) are positioned apart from and below the hopper (15). The inner frame (100) is located at its starting position. The starting position of the inner frame (100) is such that the top of the edges of the dough-cutting member (38) is almost flush with the upper flat surface (114), and a small gap is provided between the vertical surface (128) and the rear vertical surface (116).

Figure 7:
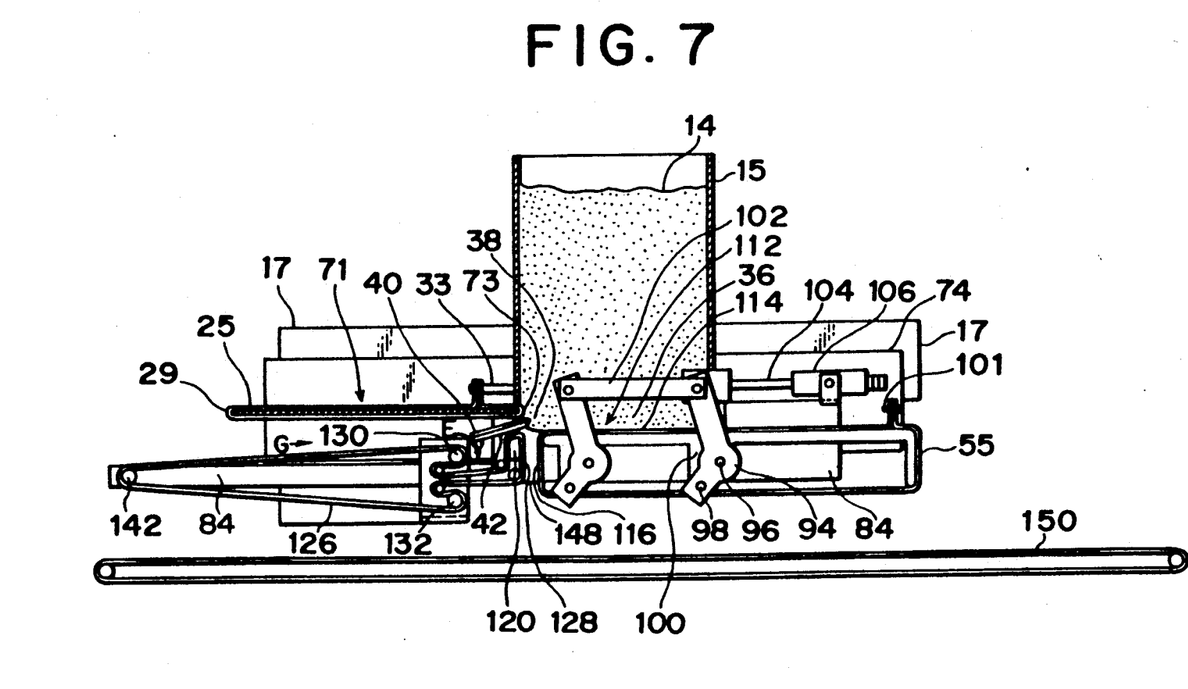

As shown in FIG. 7, the air cylinder (106) is actuated to have the rod (104) extend from its starting position, thereby causing the swing elements (94) to incline by a preset angle. Therefore, by the action of the link mechanisms, the inner frame (100) is moved parallel to the hopper (15), from its starting position, away from the vertical surface (128). Then, the intermediate frame (84) is stopped at a position calculated to provide a preset dough thickness, and this position remains unchanged. The height difference between the edges of the dough-cutting member (38) and the flat upper surface (114) is 8 mm.

The motor (76) is then actuated to have the pinion (78) rotated. This causes the rack (80) to be moved, thereby causing the outer frame (74), to which the rack (80) is fixed, to be moved in a direction in which the edges of the dough-cutting member (38) are directed, so that the cutting operation starts.

With the beginning of the movement of the outer frame (74), another drive gear (not shown) causes the lower saw blade (42) to reciprocate while it slides on the upper saw blade (40), so that the cutting movement begins. Thus the edges of the dough-cutting member (38) are advanced into the dough mass (14).

The edges of the upper saw blade (40) and the lower saw blade (42) provide fine cutting movements. These are effective in cutting dough bread that has a strong elasticity and a high cutting resistance. The dough mass (14) is cut into divided plate-like dough pieces, while a finely cut surface is formed.

The advance of the outer frame (74) causes the first plate (25) to be advanced together with the dough-cutting member (38). This causes the first belt (29) to conform to the advance of the first plate (25) and a part of the belt initially positioned under the first plate (25) is caused to take a position above said plate (25), so that the area of the flat upper surface (73) positioned in the hopper (15) is increased.

The two ends of the first belt (29) are securely mounted to the first bracket (33), so that the first belt (29) cannot be freely rotated. Therefore, there is no relative movement of the belt (29) on the flat upper surface (73) relative to the bottom (36) of the dough mass (14).

Simultaneously with the beginning of the cutting of the dough, the inner frame (100) is retracted, so that the area of the flat upper surface (114) is decreased. The two ends of the second belt (55) entrained on the inner frame (100) are securely mounted on the second bracket (59). Therefore, the flat upper surface (114) of the belt (55) does not move relative to the bottom (36) of the bread dough mass (14). Thus no tensile force due to any possible friction between the flat upper surface (114) of the second belt (55) and the dough mass is imparted to the dough mass (14).

The advance of the outer frame (74), namely, the advance of the intermediate frame (84), causes the endless belt (126) to have the driven roller (130), which as stated before is rotatable only in the direction indicated by the arrow (E), rotate clockwise, thereby allowing the passage of the belt (126) along the roller (130), while engaging it. Then, the belt (126) passes along the small plate (120) and downward. The belt (126) travels the same distance that the inner frame (100) is moved. The belt (55) also travels the same distance that the inner frame (100) is moved. Therefore, the vertical surfaces (116 and 128), providing a discharge path (148), are moved in the same downward direction and at the same speed to discharge a piece of divided bread dough. This avoids bending the divided dough pieces. The pieces of bread dough are then placed on a supply conveyor (150).

Figure 8:
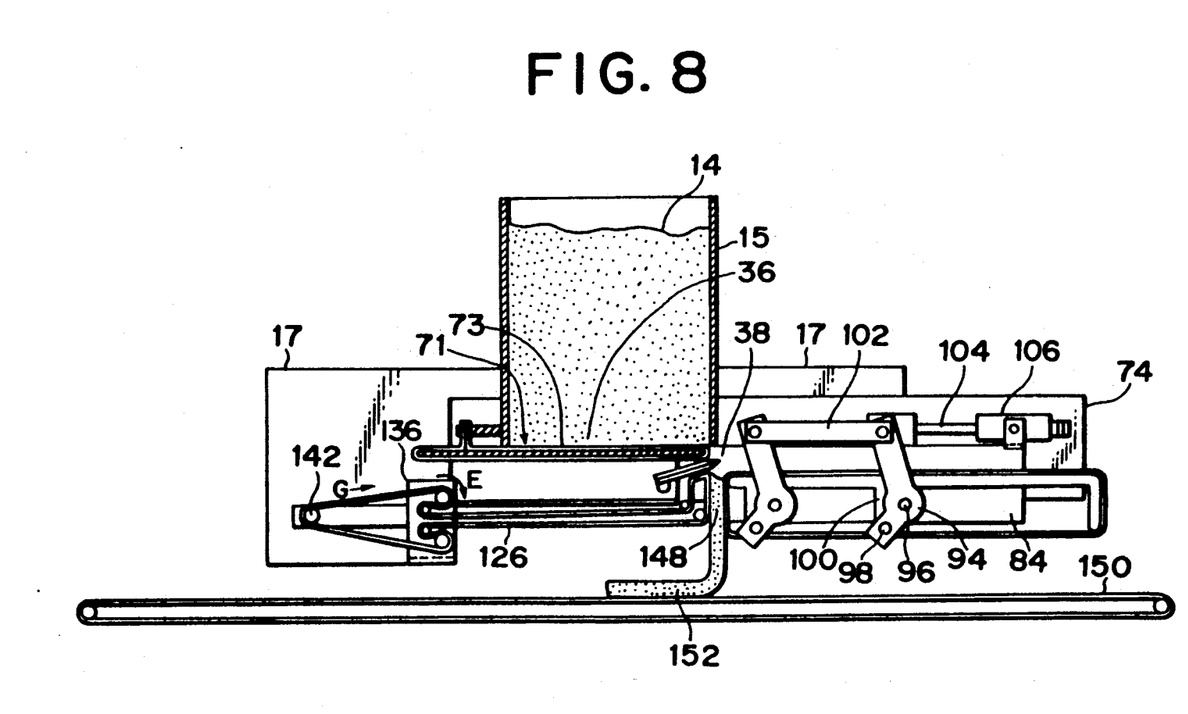
Figure 9:
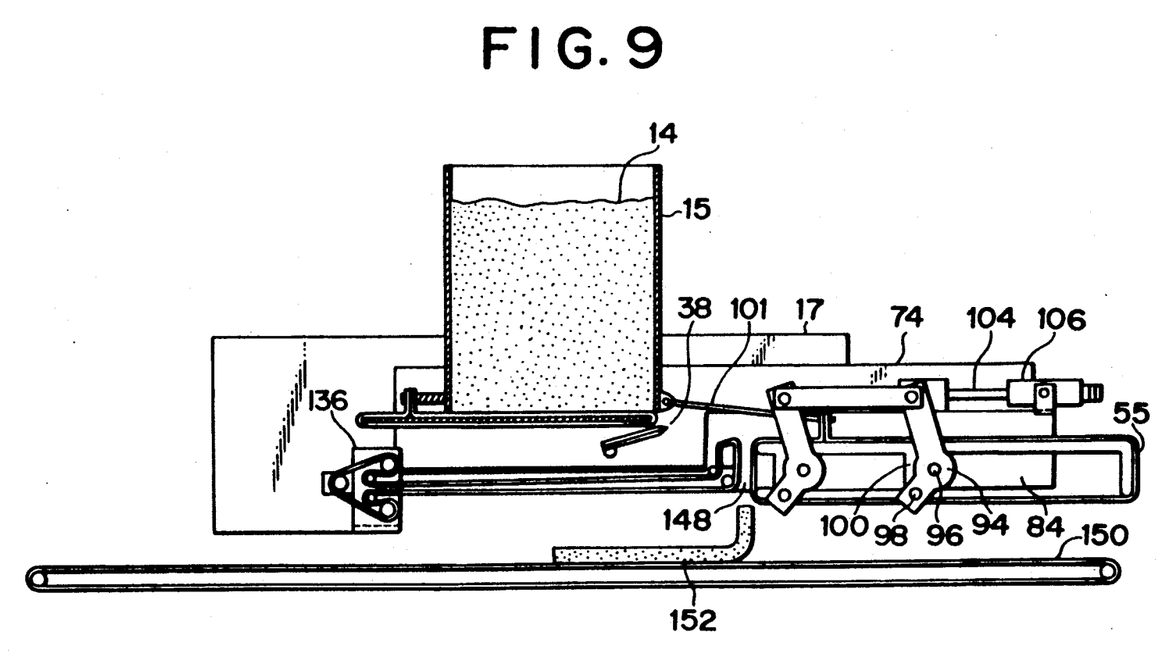
Figure 10:
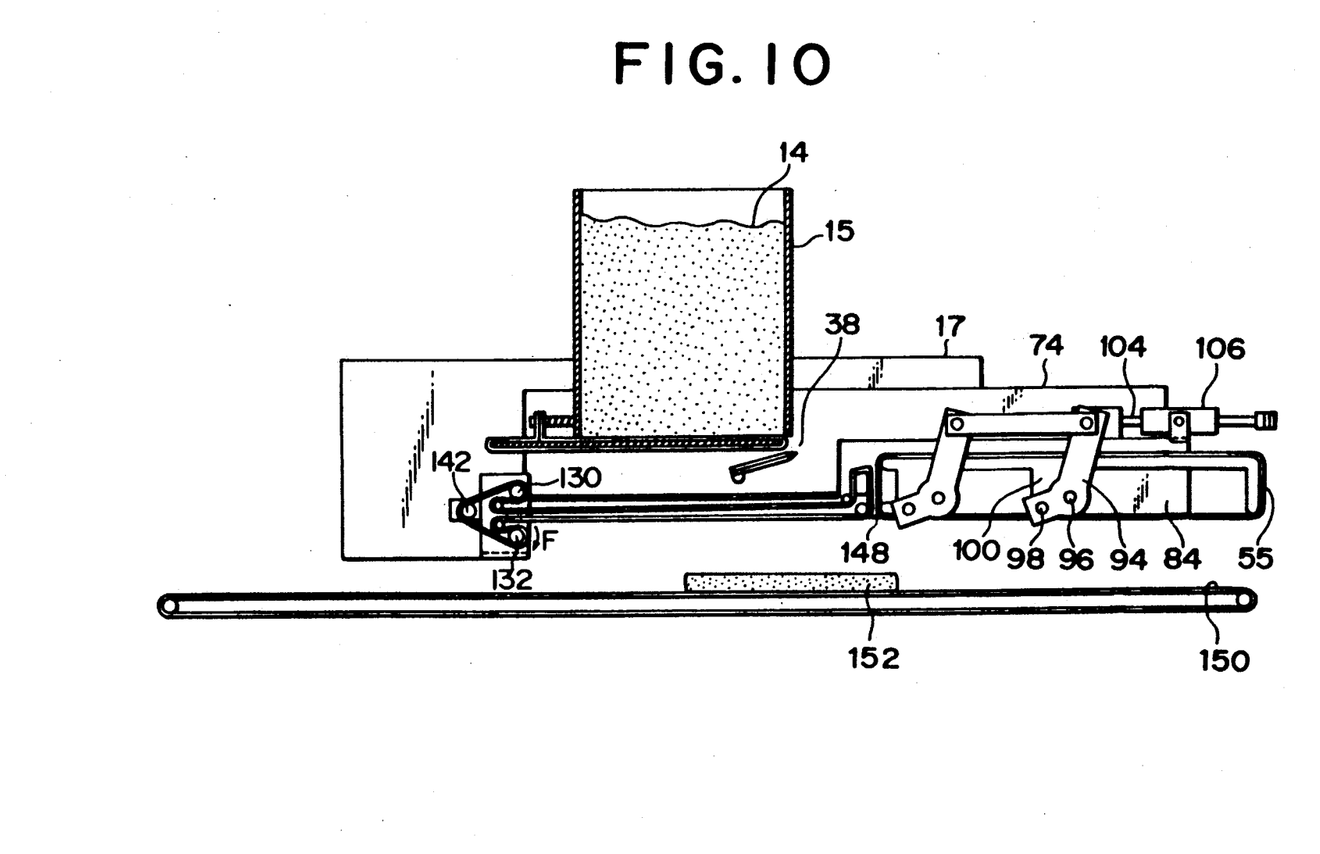

As shown in FIG. 8, when the cutting operation of the dough mass (14) is finished, the sliding movements of the dough-cutting member (38) are stopped. The front of the piece of divided bread dough (152) is placed on the supply conveyor (150), but its end still remains in the discharge path (148). Then the air cylinder (88) is actuated to extend the rod (92). Therefore, as shown in FIG. 9, the intermediate frame (84) is advanced horizontally relative to the outer frame (74), thereby discharging the piece of divided dough (152) to the supply conveyor (150). Then, as shown in FIG. 10, the air cylinder (106) is actuated to retract the rod (104), so that the inner frame (100) returns to a position whose height is the same as that of its starting position. Then, the rod (92) of the air cylinder (88) is retracted to cause the inner frame (100) to return to its starting position. Finally, the outer frame (74) begins to move in a direction opposite to that in the cutting operation, to return to the starting position. At the same time, the flat upper surface (73) begins to retract, so that its area in the hopper begins to decrease. During the retraction no pulling action is applied to the bread dough (14).

Also, the area of the flat upper surface (114) in the hopper is increased, while no pulling action is applied to the bread dough (14). Finally, the outer frame (74) returns to the starting position for cutting, whereby one cycle of the cutting operation is completed.

If, by the link mechanisms, the inner frame (100) is moved in a forward and downward direction at an oblique angle of almost 45 degrees relative to the intermediate frame (84), while the parallel relationship of the inner frame (100) with the intermediate frame (84) is maintained, any height difference between the upper surface of the cutting member (38) and the flat upper surface (114), and the gap of the discharge path (148) formed by the vertical surfaces (116 and 128), can be simultaneously and evenly adjusted. Therefore, not only is the dough thickness preset by the adjusting nut (108), but also, it is reset with an accuracy needed for practical purposes.

To adjust and monitor the dough thickness, a dough-thickness setting displaying device (not shown) that interlocks with the swing element (94) is used.

A third embodiment of this invention will now be explained by referring to the attached drawings.

In this embodiment, a pressing device and its related elements are combined with the dividing apparatus used in the first embodiment of this invention.

Figure 11:
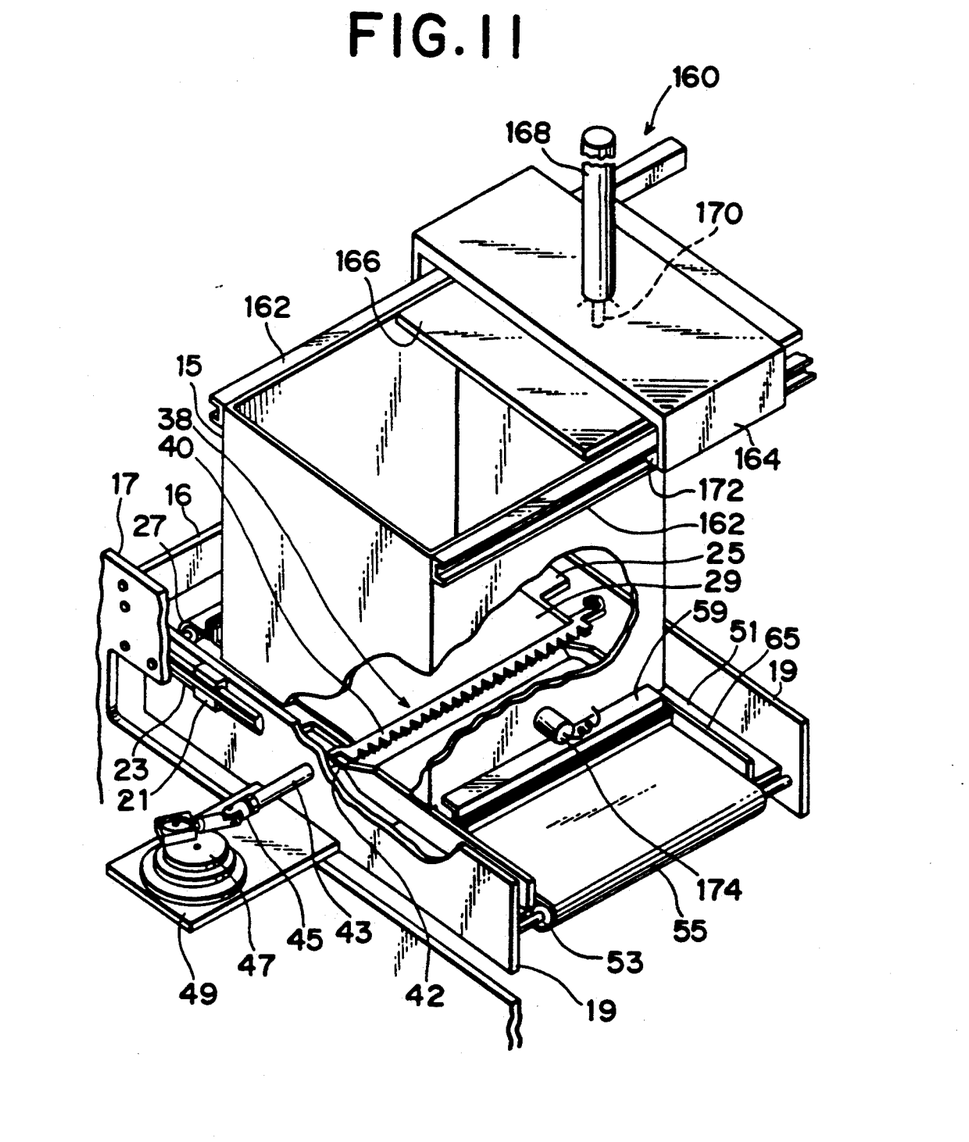
FIG. 11 is a perspective view of a third embodiment of this invention, partially broken away.

In FIG. 11, rails (162), each being U-shaped in cross section, are mounted on the upper end of the hopper (15). A pressing device (160) comprises a beam member (164), a pressing board (166), and an air cylinder (168). The pressing board (166) has dimensions somewhat smaller than the inner dimensions of the hopper (15). The air cylinder (168) is mounted vertically on the beam member (164). The rod (170) of the air cylinder (168) extends downward, and on the lower end of the rod (170) the pressing board (166) is mounted. The beam member (164) is supported by two riders (172), each extending inwardly from the respective end of the beam member (164). Each rider (172) is received in, and slides in, a respective channel in the rails (162) Therefore, the pressing device (160) can be slidably moved on the hopper (15). The device (160) is normally arranged at a position apart from the hopper (15). A pressure sensor (174) is arranged at the lower part of the hopper (15).

The operation of the third embodiment of the apparatus, other than the operation of the pressing device, for dividing the bread dough, is almost the same as that in the first embodiment. Since the pressing device applies force to the outside of the bread dough mass so as to maintain the pressure in the bread dough at a uniform value, almost all of the bread dough in the hopper (15) can be cut and divided into pieces of bread dough, without regard to the amount of bread dough remaining in the hopper.

If no pressing device (160) is provided, the decreased dough in the hopper (15) causes the weight of the dough mass (14) in the hopper (15) to be decreased, so that the pressure in the dough decreases. Therefore, the dough mass cannot resist the advancing cutting member (38), so that the cutting member (38) cannot cut the bread dough mass. Thus the cutting member (38) merely pushes the dough in any direction. Therefore, not all the bread dough in the hopper can be properly cut.

In the apparatus of this invention, when the dough in the hopper (15) decreases below a preset amount, the pressing device (160) that is normally arranged at a position apart from the hopper (15) is caused to be moved onto the hopper (15). Then the pressing board (166) pushes the dough mass, thereby increasing the pressure in the dough. Therefore, the bread dough is held by the housing device (160), and the cutting operation can be smoothly continued.

Regarding the third embodiment of this invention, the remaining amount of the dough mass (14) in the hopper (15) is monitored and calculated after the dough mass is charged in the hopper (15), and thereafter the pressing device (160) pushes the dough mass (14) forward. However, processes using the apparatus of this invention are not limited to such a procedure. Namely, another procedure may be used, in which, for example, the pressing device is actuated just after the dough has been charged in the hopper. Then, based on the information from the pressure sensor (174), pressure is continuously applied to the dough mass (14). In this case, the pressure is gradually increased in response to the decreased dough mass (14) in the hopper (15).

In conclusion, in this invention, since the discharge means is arranged below and adjacent the dough-cutting member (38), the deformation of the front of a piece of dough, due to the reaction of the stress in the dough against the outer force, can be corrected, by compressing the front of the piece of dough by the discharge means. Also, since the discharge means pulls a piece of cut dough downward, the dough-cutting member can smoothly cut the bread dough mass. Further, if, after cutting, a part of the bread dough adheres to the underside of the dough-cutting member, it can be peeled off by the downward movement of the discharge means.

Further, by the adjusting means of this invention, in response to the desired thickness of the bread dough to be cut, the size of the dough outlet, which defines the thickness of the bread dough, of the apparatus, can be easily changed. Therefore, quickly changing the thickness of a piece of bread dough can be easily attained. This results in saving production time, leading to high productivity.

Moreover, since the pressing means of this invention applies a force to the outside of the bread dough mass in the hopper so as to maintain uniform pressure in the dough, almost all of the bread dough in the hopper can be cut and divided into pieces of bread dough. Namely, without regard to the remaining amount of bread dough in the hopper, a bread dough mass charged in the hopper is almost completely used. Therefore, bread dough can be economically cut, thereby obtaining pieces of bread dough having certain preset specifications. This results in lowering the production costs, which leads to saving energy and resources.

We claim:

1. An apparatus for dividing plastic dough material comprising:
   a hopper for dough material, the bottom of which is constituted by a first dough-supporting member, a second dough-supporting member, a dough-cutting member, and a dough material outlet, said first dough-supporting member being movable back and forth, and comprising a flat upper surface, a bottom surface, a horizontal forward edge, and a rearward edge, said forward edge extending perpendicular to the direction of movement of said member, said dough-cutting member comprising a saw blade means, and positioned at said forward edge of said first dough-supporting member, a first drive means for reciprocating said saw blade means in its longitudinal direction while said first dough-supporting member is moved in its advancing direction, said second dough-supporting member being movable in the same direction and in synchronization with said first dough-supporting member, being provided with a flat upper surface positioned at a level below the upper surface of said first dough-supporting member, thereby forming said dough material outlet, having a preset distance between said second dough-supporting member and said cutting member, and a second drive means for moving said first and second dough-supporting members back and forth, characterized by a discharge means, arranged adjacent and below said dough-cutting member, for regulating the thickness of a piece of dough material cut so as to have a thickness corresponding to said preset distance.

2. The apparatus of claim 1, in which said discharge means comprises a pair of belt conveyors arranged such that their belts constitute a discharge path having a gap corresponding to said preset distance.

3. The apparatus of claim 1, in which the plastic dough material is either bread dough or confectionery dough.

4. An apparatus for dividing plastic dough material comprising:

a hopper for dough material, the bottom of which is constituted by a first dough-supporting member, a second dough-supporting member, a dough-cutting member, and a dough material outlet, said first dough-supporting member being movable back and forth, and comprising a flat upper surface, a bottom surface, a horizontal forward edge, and a rearward edge, said forward edge extending perpendicular to the direction of movement of said first dough-supporting member, said dough-cutting member comprising a saw blade means, and positioned at said forward edge of said first dough-supporting member, a first drive means for reciprocating said saw blade means in its longitudinal direction while said first dough-supporting member is moved in its advancing direction, said second dough-supporting member being movable in the same direction and in synchronization with said first dough-supporting member, being provided with a flat upper surface positioned at a level below the upper surface of said first dough-supporting member, thereby forming said dough material outlet between said second dough-supporting member and said cutting member, and a second drive means for moving said first and second dough-supporting members back and forth, characterized by an adjusting means for moving said second dough-supporting member in parallel with and relative to said first dough-supporting member, thereby to adjust the size of said dough material outlet.

5. The apparatus of claim 4, in which said adjusting means is a link mechanism.

6. The apparatus of claim 4, in which the plastic dough material is either bread dough or confectionery dough.

7. An apparatus for dividing plastic dough material comprising:

a hopper for dough material, the bottom of which is constituted by a first dough-supporting member, a second dough-supporting member, a dough-cutting member, and a dough material outlet, said first dough-supporting member being movable back and forth, and comprising a flat upper surface, a bottom surface, a horizontal forward edge, and a rearward edge, said forward edge extending perpendicular to the direction of movement of said first dough-supporting member, said dough-cutting member comprising a saw blade means, and positioned at said forward edge of said first dough-supporting member, a first drive means for reciprocating said saw blade means in its longitudinal direction while said first dough-supporting member is moved in its advancing direction, said second dough-supporting member being movable in the same direction and in synchronization with said first dough-supporting member, being provided with a flat upper surface positioned at a level below the upper surface of said dough-supporting member, thereby forming said dough material outlet between said second dough-supporting member and said cutting member, and a second drive means for moving said first and second dough-supporting members back and forth, characterized by a pressing means, provided in said hopper for dough material, for pressing dough material in said hopper for dough material, said pressing means having a pressing board.

8. The apparatus of claim 7, in which a pressure sensor is provided in said hopper for dough material.

9. The apparatus of claim 7, in which the plastic dough material is either bread dough or confectionery dough.

* * * * *